Patented Sept. 24, 1929

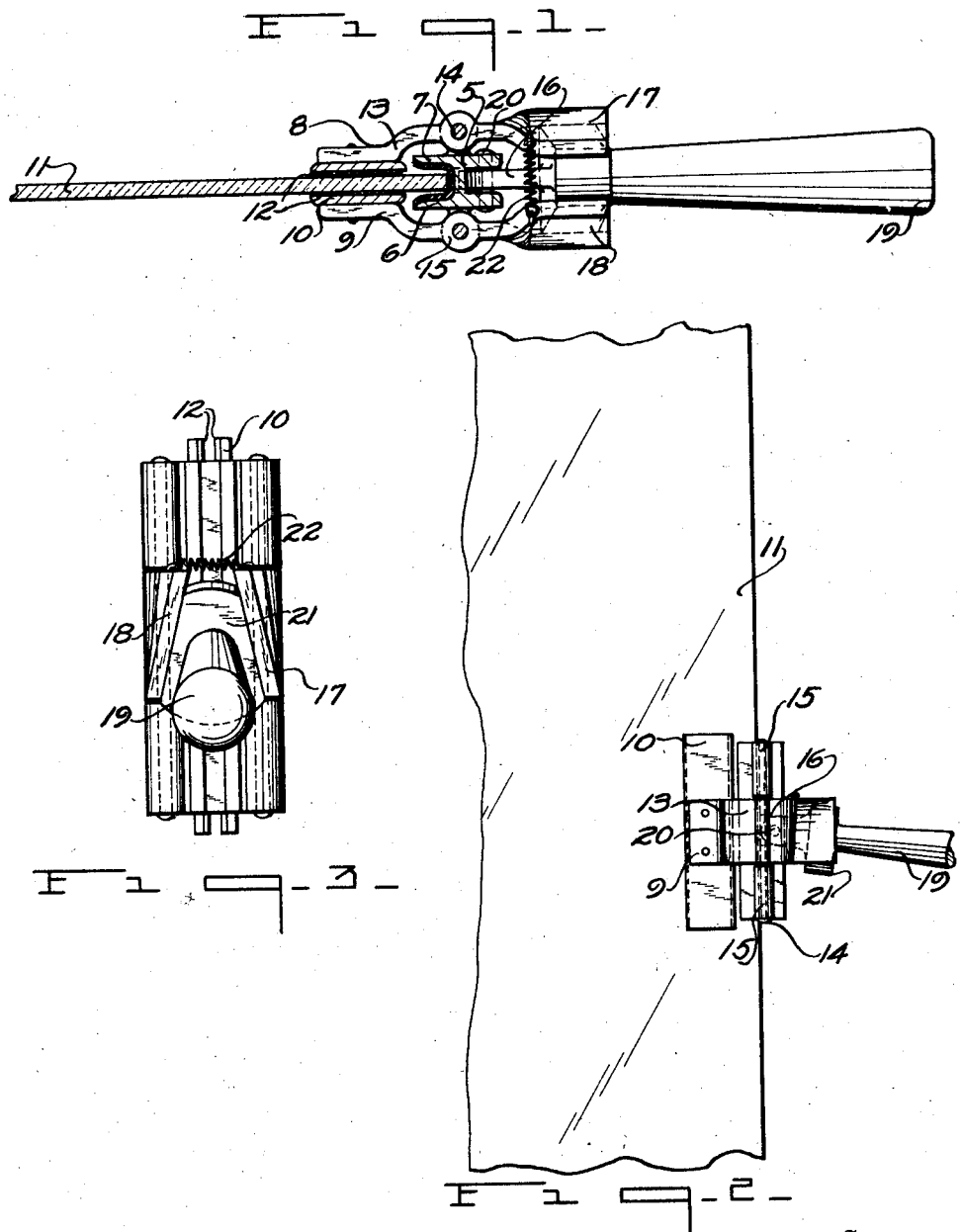

1,729,114

UNITED STATES PATENT OFFICE

ALFRED E. LOUVIAUX, OF TOLEDO, OHIO, ASSIGNOR TO LIBBEY-OWENS GLASS COMPANY, OF TOLEDO, OHIO, A CORPORATION OF OHIO

HANDLING DEVICE

Application filed September 12, 1927. Serial No. 219,158.

The present invention relates to a handling device.

An important object of the invention is to provide a handling device, and particularly a device adapted for the handling of sheet glass.

Another object of the invention is to provide a sheet glass lifting device including clamping members and a handle, the clamping members being made operative and inoperative by manipulation of the handle.

Another object of the invention is to provide a device of this character comprising a body portion having glass clamping plates pivotally associated therewith, and a handle for moving the glass clamping plates into an operative position when it is desired to handle a sheet of glass.

A further object of the invention is to provide a device of this character comprising a body portion having glass clamping plates pivotally associated therewith, and a handle having a cam member adapted for engagement with a portion of said plates, whereby upon movement of the handle in one direction the plates will be moved into an operative position, and means for normally urging said plates into an inoperative position, so that when the handle is moved in the opposite direction the device can easily be removed from the sheet.

A still further object of the invention is to provide a handling device of this character comprising a body portion, glass clamping plates pivotally associated therewith, and a pivoted handle member having means carried thereby for placing the clamping plates in operative position upon upward vertical movement of said handle, the more pressure that is exerted upwardly on said handle the tighter the clamps will engage the sheet of glass, said sheet being released upon downward vertical movement of said handle.

Other objects and advantages of the invention will become more apparent during the course of the following description when taken in connection with the accompanying drawings.

In the drawings wherein like numerals are employed to designate like parts throughout the same, Fig. 1 is a top plan view of the lifting or handling device in operation, and partly in section for the purpose of illustration, Fig. 2 is a side elevation of the device in use, and Fig. 3 is an end view thereof.

The present invention has been designed primarily to facilitate the handling of sheet glass, and is particularly well adapted for the handling of relatively large sheets. Of course the invention is not in any way limited to the handling of large sheets of glass. The lifting device comprises a body portion 5 having a groove or recess 6 formed therein which is preferably lined or covered with rubber, felt, or the like 7. Pivotally associated with the body portion 5 are glass clamping plates 8 and 9. The plates comprise the members 10 adapted for contact with the glass sheet 11, and to prevent injury to the glass and to obtain the proper friction to permit handling of said sheet, the members 10 may be provided with a suitable covering 12. The arm portions 13 of the plate members are pivotally connected to the body portion by means of the pins 14 extending through the sleeves 15 on the body portion and sleeve 16 on the plate clamping members.

The rear ends of the plate clamping members terminate as shown in Figs. 1 and 3. It will be seen that the ends 17 and 18 respectively form a substantially V-shaped pocket. A handle 19 is pivoted to the body portion 5 by means of a pin 20 and carries a cam member 21 which is adapted to be received in the V-shaped pocket formed between the extensions 17 and 18.

A spring member or other resilient means 22 is provided to normally urge the ends 17 and 18 toward each other, and as the arms are pivoted between their ends the glass engaging portions of the arms will be normally held apart.

In use the handling device is positioned so that the small end of the V-shaped recess formed between the ends of the arms will be uppermost as shown in Fig. 3. It is preferred that two such devices be used, one on each vertical side of the sheet to be handled. On large sheets two workmen may be required to handle a sheet, and in this case each workman can use one hand to grasp the handle 19 while the workman with his free hand can steady the sheet.

To lift a sheet of glass the device is placed substantially as shown in the drawings, wherein the edge of the sheet is received in the groove formed in the body portion. The handle 19 is then lifted vertically, whereby the cam 21 will separate the ends of the arms contacting therewith, which will cause the sheet to be firmly clamped between the covered plates 10. With this construction any thickness and weight of sheet may be handled without the necessity of making adjustments or the like. As the handle is lowered the cam will leave the V-shaped recess, thus allowing the spring 22 to cause a separation of the clamping plates and thus releasing the sheet of glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A glass lifter of the character described, comprising movable glass clamping plates and a movable handle associated therewith, said glass clamping plates being moved into an operative position by movement of said handle.

2. A glass lifter of the character described, comprising movable glass clamping plates and a movable handle associated therewith, said glass clamping plates being moved into an operative position by movement of said handle, and means for normally urging said plates to an inoperative position.

3. A glass lifter of the character described, comprising a body portion, glass clamping plates pivotally associated therewith, a handle carried by the body portion and having means for moving the plates into an operative position by rocking them about their pivots.

4. A glass lifter of the character described, comprising a body portion, glass clamping plates movably mounted thereon, means for normally urging the plates apart, and a handle carried by the body portion for moving the clamping plates in an operative position.

5. A glass lifter of the character described, comprising movable glass clamping plates, and cam means for moving said plates into an operative position.

6. A glass lifter of the character described, comprising movable glass clamping plates, cam means for moving said plates into an operative position, and resilient means for normally urging said clamping plates into an inoperative position.

7. A glass lifter of the character described, comprising a body portion, arms pivotally mounted thereon, glass clamping plates carried thereby, and cam means adapted for contact with said arms for moving the glass clamping plates into an operative position.

8. A glass lifter of the character described, comprising a body portion, a pair of arms pivotally mounted thereon, a glass clamping plate carried by each arm, a handle member, and cam means carried by the handle and adapted for engagement with said arms to move the glass clamping plates into operative position when said handle is moved in one direction.

9. A glass lifter of the character described, comprising a body portion, a pair of arms pivotally mounted thereon, a glass clamping plate carried by each arm, a handle member, cam means carried by the handle and adapted for engagement with said arms to move the glass clamping plates into operative position when said handle is moved in one direction, and means for moving said plates into an inoperative position when the handle is moved in the opposite direction.

10. A glass lifter of the character described, comprising a body portion, a pair of arms pivotally mounted thereon, a glass clamping plate carried by each arm, a handle member, and cam means carried by the handle and adapted for engagement with said arms to move the glass clamping plates into operative position when said handle is moved in one direction, said body portion having a recess therein for receiving the edge of the sheet of glass to be lifted.

11. A device for lifting sheet material disposed in a vertical position, including a pair of movable clamping plates adapted for engagement with one vertical edge portion of the sheet and a movable handle associated therewith, said clamping plates being movable into operative engagement with the sheet upon vertical movement of said handle.

12. A device for lifting sheet material disposed in a vertical position, including a body portion, clamping plates pivotally associated therewith and adapted for engagement with one vertical edge portion of the sheet, and a handle pivotally carried by said body portion and having means for moving the plates into operative engagement with the sheet upon vertical movement of said handle.

13. A device for lifting sheet material disposed in a vertical position, including a body portion having a recess therein for receiving one vertical edge of the sheet, a pair of arms pivotally carried by the body portion intermediate their ends, a handle also pivoted to the body portion and projecting rearwardly beyond said arms, and cam means carried by said handle and received between the rear ends of said arms in such a manner that upon raising of the said handle, the rear ends of said arms will be spread apart to move the forward ends thereof together into operative engagement with said sheet.

Signed at Toledo, in the county of Lucas and State of Ohio, this 8th day of September, 1927.

ALFRED E. LOUVIAUX.